Figure 5:
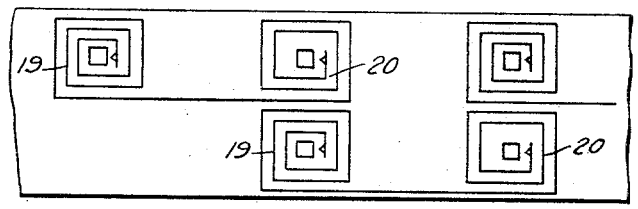

Feb. 17, 1959    P. EISLER    2,874,360
ELECTRICAL WINDINGS
Filed April 7, 1953    2 Sheets-Sheet 1
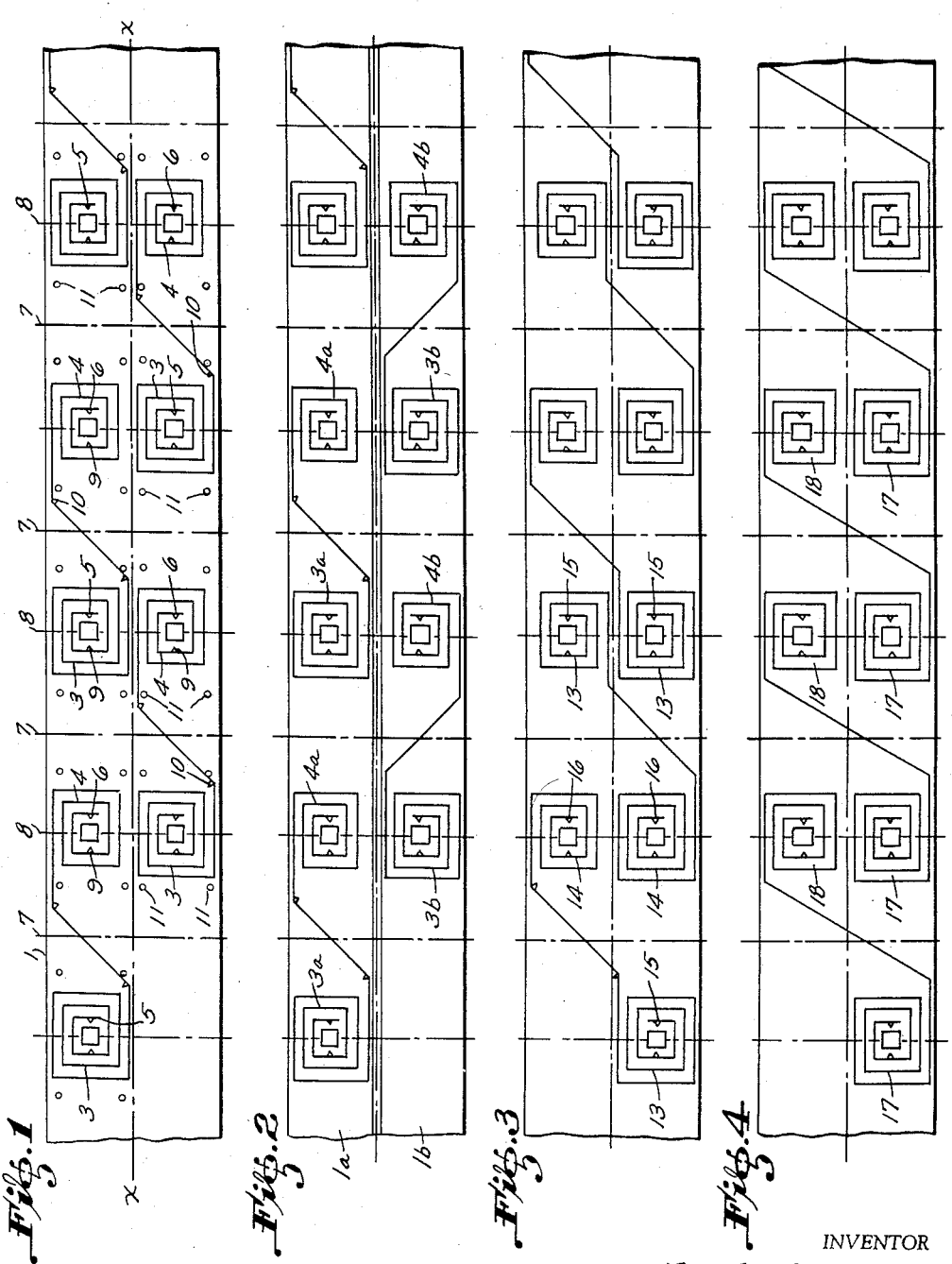
INVENTOR
Paul Eisler
BY
ATTORNEY Feb. 17, 1959 P. EISLER 2,874,360
ELECTRICAL WINDINGS
Filed April 7, 1953 2 Sheets-Sheet 2

INVENTOR
Paul Eisler
BY
ATTORNEY

United States Patent Office 2,874,360
Patented Feb. 17, 1959

2,874,360

ELECTRICAL WINDINGS

Paul Eisler, London, England

Application April 7, 1953, Serial No. 356,691

2 Claims. (Cl. 336—200)

The present invention relates to the production of electrical windings.

An object of the invention is to produce a continuous or indefinite length of composite material which comprises a succession of layers, each containing one or more windings, which material can be cut into sections comprising one or more layers which constitute or can be connected to constitute a winding of the nature and value required. If each layer comprises but a single winding and all are joined in series, an inductance results. But the invention contemplates layers containing multiple windings so that by connecting them in two groups a transformer can be produced. The same result can be obtained by connecting several layers each comprising a single winding in two groups; close coupling is obtained by connecting the several layers so that the primary and secondary comprise alternating or interspersed layers. The invention further contemplates connection of successive layers in inductive opposition so that the complete section is a substantial non-inductive winding comprising a considerable length of conductor in a small space as may be desired for example in a heating device.

In accordance with the invention I make a flat strip which can be produced in indefinite length and incorporates flat section conductors, and insulation and by bending out of its original form, I bring it into a form which comprises successive juxtaposed spiral windings. I can then cut this into sections as required and if necessary interconnect the windings.

In one form of the invention, the strip comprises spiral windings in order on a flexible insulating support. The strip is first folded along its longitudinal mid axis, or what comes to the same thing, two strips each comprising half the pattern are superposed, the spirals are connected together, the folded or double strip is folded concertina fashion to bring all the windings into superposition. From this folded strip any desired number of folds can be cut off.

In another form of the invention, I produce a tape containing a plurality of flat section conductors side by side, insulated from one another and I wind this into a succession of spirals with the cross-section of the strip axially disposed and with the tape leading from the outer end of each spiral to the inner end of the next. Any required number can be cut off the succession and the end of the last spiral connected to the beginning of the first. Since the tape includes a plurality of conductors, interconnection can be effected in various ways according to the result desired, e. g. whether a simple inductance or a transformer is to be produced; parallel connections of any number of conductors up to the total in the strip can also be used to obtain greater carrying capacity.

Further objects and features of the invention will appear from the following description with reference to the accompanying diagrammatic drawings which illustrate examples embodying the invention.

Figures 9, 10, 11, 12:
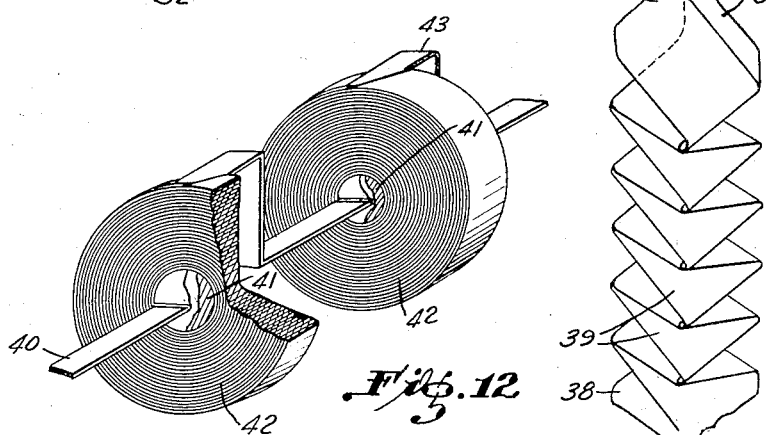

Figs. 1 to 6 show in plan various examples of the invention in the form first above described, Figs. 7 to 10 show in elevation various examples of the combination of the first form of the invention with magnetic cores, Fig. 11 shows in perspective a plaited structure incorporating a plurality of strips according to the first form of the invention and Fig. 12 shows in perspective an example of the second form of the invention.

As shown in Figure 1, I prepare on an insulating support 1, for example of impregnated paper or fabric, two series of repeating conductive patterns on opposite sides of the mid axis $x$, $x$, each consisting of pairs of spirals 3, 4 in a generally S-like form, the ends of the two spirals being at the innermost turn. For simplicity the spiral conductor is indicated as a line, but it will in practice be relatively wide in the plane of the drawing and thin perpendicular to it. Also for simplicity a relatively coarse spiral is shown. All the spirals in a series are equally spaced but one series is staggered half a pitch in relation to the other, and all ends 5, 6 are equidistant from the $x$ axis and the opposite pairs lie on the same transverse axes. It will be seen that geometrically all the spirals are identical but that electrically in any one pair of spirals constituting an S there is one right handed spiral and one left handed, that is current passing through the pair in series would circulate one way in one and the other in the other. If now the strip is doubled over along the $x$ axis, owing to the relative staggering of the two series, right and left handed spirals for the respective series will be superposed, but because of the doubling, one superposed spiral will be reversed in relation to the other so that if the two inner ends are joined, a current traversing both will circulate in the same direction over the whole of its passage. As the inner ends 5, 6 of the spirals are all equidistant and the opposite pairs lie on the same transverse axes, the inner ends 5, 6 of opposite pairs will be superposed and can be connected together mechanically and electrically as by riveted and soldered or welded joints. When so connected all the spirals of both series are connected in series in regular order, but while the strip is only doubled along the $x$ axis, successive interconnected pairs will be to opposite hands electrically alternately. If now the doubled strip is folded zig zag or concertina fashion, by doubling in opposite directions alternately on transverse axes 7 midway between the transverse axes 8 of the spirals, all the spirals will be superposed and will be electrically of the same hand, so that the succession of spirals will be inductively additive. A desired value can be obtained by cutting a section from the indefinite length of composite material, comprising an appropriate number of folds, and the end connections can be made to either the inner ends of the end spirals or to the severed cross bars of the spirals at the two ends of the section, depending on where the section is cut off from the main length of material. Small adjustments may be made by connection to lugs 9 or 10 spaced from the extreme ends.

It will be understood that the successive spirals must be insulated from one another. If the original doubling on the $x$ axis is effected to keep the spirals on the outer faces, the support 1 will itself constitute insulation between them, but a further layer of insulation must be provided before the concertina folding is completed. This may comprise separate sheets of insulation between successive folds, or a layer may be secured over the two series of spirals before or after the original doubling. Alternatively, the original fold may be the other way, when insulation must be introduced between the two inside faces of the fold; such insulation may if desired be first secured over one or both series of spirals.

It will also be understood that the nature of the insulation must be such as will permit the necessary folding. Thus the support 1 may be wholly flexible, or it may be flexible only along the x axis and the transverse axes 7.

It will further be understood that two separate supports each bearing one series of pairs of spirals may be used in which case the x axis in Figure 1 represents the edges of these two strips. Instead of doubling the single strip 1, in this case the separate strips are superposed in corresponding fashion. In this case slight longitudinal adjustments may be made to bring an end 5 for example over a lug 9, thus effectively reducing the corresponding spiral by about half a turn.

Holes 11 may be provided at the centre of the spirals, and other holes 12 for the passage of clamping or mounting means.

A further possibility which will reduce the amount of insulating material necessary, when two separate strips are used, is to make the spirals which are superposed by the first stage, to opposite hands geometrically. This is illustrated in Figure 2 in which 1a, 1b are the two strips. In this case the series 3b, 4b is geometrically to the opposite hand to the series 3a, 4a, and the superposition instead of being the equivalent of doubling about the x axis of Figure 1 is a direct superposition so that the strip 1b is placed on the series 3a, 4a. Thus the strip 1b insulates the series 3a, 4a from the series 3b, 4b but additional insulation will be necessary between the spirals 3b and 4b only, when the concertina folding is effected. At this stage the strip 1a insulates the spirals 3a, 4a from one another.

Figure 3 shows another possibility. Here the two spirals 13, 14 of a pair are on opposite sides of the mid axis x and they are connected together C fashion, i. e., they are geometrically to opposite hands but electrically to the same hand. When this structure is folded along the x axis and the ends 15, 16 are interconnected, and the whole suitably insulated is then folded concertina fashion, an additive inductive effect is again obtained.

Figure 6:
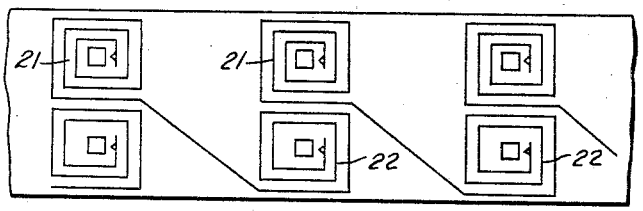

In some cases, for example for heating elements, non-inductive sections may be desired. These can be obtained by arranging the spirals as in Figures 4, 5 and 6. In Figure 4 an S arrangement is used but the two spirals of each pair 17, 18 are on opposite sides of the x axis. In Figure 5 two series of C connected pairs of spirals 19, 20 are used to the same effect. Here the two series are on opposite sides of the x axis but the same result can be obtained by using a single series of C connected pairs 21, 22 with the connecting bridge crossing the x axis, as shown in Figure 6.

The actual production of the support and spiral conductor can be effected in various ways, for instance by the methods described in my Patent No. 2,441,960 and in my co-pending applications Ser. Nos. 11,796, 11,797, 11,798 and 20,813, or my application entitled Electric Connecting Strip, filed October 1949. I prefer to stamp the spirals out of copper foil while on a support suitable for the stamping operation, transfer them to a supporting insulating sheet, e. g., a strip of adhesive paper, fold this paper along the x axis (or superpose two separate strips where that method is used) join the superposed lugs at the ends of the spiral by welding or eyeletting and soldering, apply cover sheets, and fold in concertina fashion on the appropriate transverse lines. The supporting sheet may be punched with openings for the joints and if desired at the centres of the spirals.

Figures 7, 8:
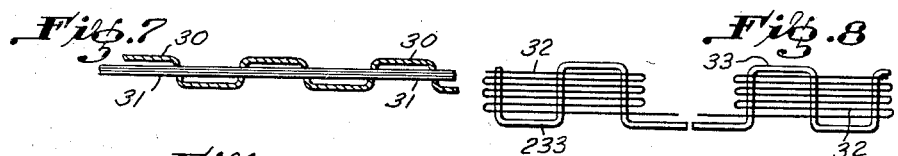

The inductive strip according to the invention provided with central apertures such as 10 in Fig. 1 can be used in conjunction with a great variety of iron cores and requires only small gaps if slipped on fold by fold. As shown in Fig. 7 for example by means of central holes, the strip 30 doubled but not folded concertina fashion is threaded over a stiff laminated iron core 31, the strips having a wavy formation which is practically equivalent to the concertina folding above described. The core may be part of the core of a transformer; thus the primary winding may be on one limb of an L-shaped core and the secondary on a limb of another L-shaped core, the two cores then being clamped together end to end to produce a closed rectangle. In Fig. 8 the doubled (but not folded concertina fashion) strip 32 is folded into two series of concertina folds of several pitches between each and a core made up of thin flexible iron strips 33 is threaded through the holes at the centres of the spirals in a wavy formation. The whole is then doubled over between the two series of folds, and the ends of the iron core are clamped together at 34, Fig. 9. By constructions such as those shown in Figs. 7 to 9 flat chokes or transformers may be built.

In Fig. 10 a practical type of transformer is shown produced from the doubled (but not concertina folded strip) 35 and steel strips 36 on both faces which are welded together at 37 through the centres of the spirals and thus form the short circuited secondary of a flat transformer which can be used as an induction heating element for instance for floor heating or for immersion heating.

A flexible but mechanically easily manipulated and self-supporting assembly suitable for immersion heating or other heating service can be made by plaiting a plurality of strips together. Non-inductive strips are preferably used, or if there is an even number, inductive strips arranged in opposition could be used. Fig. 11 shows a part of such an arrangement. In this there are two strips 38, 39 each of which is folded transversely over the other. The flexibility of the strips themselves and the clearances necessary in folding enable the plaited structure to be pulled out somewhat and to flex, but it is nevertheless sufficiently self-supporting to permit easy mechanical handling.

Fig. 12 shows an example of the second form of the invention using a tape cable incorporating flat parallel conductors insulated from one another and on the surface. Here starting from an axially extending end 40, the tape is folded over on a line at 45° to produce a flat 90° bend and the tape is then wound on a core or tubular former 41 into a spiral 42 of any desired number of turns. At the end of the spiral, the tape is again folded on a 45° line to produce a flat 90° bend which brings the tape into axial direction as at 43 but at the edge of the spiral it is bent at 90° and carried radially inwardly, again bent at 90° to carry it axially for a short distance. Here it is again folded on a 45° line to bring it into position for winding another spiral 42 and so on indefinitely. When required any number of spirals can be cut off, and the necessary interconnections made between the starting and finishing ends. If the ends are long enough they can be bent axially and directly connected.

For a simple connection of all conductors in series to produce an inductance at one end the conductors numbered 1, 2, 3 etc. will be joined at the other end to conductors numbered 2, 3, 4 etc. leaving conductor n at the first end and conductor 1 at the other end for the external connections to the coil. If a non-inductive connection is required, e. g. for a compact heating or resisting device, a meandering or to and fro path can be obtained by connecting together conductors 1 and 2, 3 and 4, 5 and 6 etc. at one end, and conductors 2 and 3, 4 and 5 etc. at the other end. In either case if heavier current carrying capacity is required groups of any suitable number of conductors are connected together at both ends so putting them in parallel, and these groups interconnected either in series or to give a to and fro path according to whether an inductive or non-inductive effect is wanted. Other possible connections are for example two separate circuits, serving as primary and secondary of a transformer. This scheme gives tight coupling since the two windings have their turns very closely associated. In general it will be seen that if fewer turns are required in one of the windings, a correspondingly larger parallel group can be used so giving the higher current carrying capacity required, i. e. half the total turns will be used in each winding, but appropriately connected to give the required current carrying capacity in each.

The tubular former 4 can have any desired shape, round, rectangular, etc., and if the tape cable is self-adhesive or the tape spirals are otherwise bonded into a firm unit, the former 4 can be dispensed with entirely, the winding being effected on a collapsible mandrel from which the coil is removed when it has become a firm body, or sufficiently firm to be handled. Thin asbestos paper or another insulating layer may be wound together with the tape and thin spacing discs may be used to separate the successive spirals for increased insulation or cooling requirements. The succession may be produced with spiral sections fitting precisely into the openings of standard transformer sheet stampings so that for these standard core parts an "infinite" winding can be stocked in core-fitting standard sizes and leaving a great variety of interconnecting possibilities of the conductors open so that a number of different coil requirements and groups can be made up from the same stock material.

The tape cable for use in the above method can be produced in two main ways, by weaving or by interleaving.

Taking first the weaving method, the tape may be woven on a loom similar to that used to produce metallic ribbons for decorative packing purposes. The warp—according to the present invention—shows two fibre threads, for instance glass fibre threads, between each flat conductor, the thread diameter being as near to the thickness of the conductor as possible. The weft may also be of a glass fibre thread and the weave employed is preferably the simplest one, namely a taffeta weave. The border warp threads are also glass fibres.

Considering a cross-section along a weft thread through a tape of the structure just described, it is to be seen that although the weaving lifts depress alternate warps out of their plane, the keeping apart of neighboring conductors is ensured by the two glass fibre spacers, one of which will be below and one above the weft thread, thus blocking any possibility of contact. The relative stiffness of the flat conductors in the weft direction and the tightness of the weave also contribute to ensure the relative immobility of the conductors against each other in the plane of the tape while giving a multi-core cable of extraordinary flexibility perpendicular to the tape surface.

Instead of by weaving, the multi-core cable, according to the invention, can be produced by interleaving a web of film, suitably impregnated fabric or paper, with the flattened wires or strips of foil in the following manner:

A metal foil is slit and the odd and even numbered strips are guided on to two rollers so that a shed is formed. Alternatively, flattened wires or strips are spaced and fed over the rollers to that shed. A web of film, paper, or fabric, is fed into the shed from the side and guided into the direction of the metal strips by means of a roll mounted within the shed and having its axis inclined say at 45° to the strip direction. The strips are then pressed on to both sides of the web by means of calendering rolls and adhere to the web either by heat sealing or adhesive, or both, the web of film fabric or paper having been suitably impregnated or coated before it is fed into the described device or being of a substance suitable for heat sealing. It will be understood that the odd and even strips are now separated by the insulating web and lie on opposite sides of it.

If the calendering is done under heavy pressure and the slitting or spacing is done with precision to distance the strips correctly and the web is of sufficient deformability, a tape can be obtained as thick only as the foil and web together, because the web can then be deformed into a wavy cross-section—its thickness being the only displacement between adjacent metal strips in both co-ordinates of the tape cross-section. In the woven variety of the tape manufacture the thickness of the tape can also be reduced by using a thermoplastic or soluble weft thread and calendering the tape under pressure and heat or in the presence of a solvent softener so as to transform the weft thread into either a surface coating of the tape or an impregnation of the warp threads or both, or merely reduce its thickness and flatten the tape for use in windings, etc. The tape whether made by weaving or interleaving is now usually impregnated or surface coated by any of the well known coating processes. This conductor tape may be taken through a bath of a liquid insulator or it may be covered by an insulating tape. A conductor tape woven with glass fibres as described above and impregnated with silicone varnish and/or covered with asbestos paper tape or glass fibre tape with or without an external foil covering would be able to work up to a high temperature being free of the usual organic insulating materials while remaining extremely flexible.

A coating with an insulation film such as a thermoplastic varnish, wax, bituminous compound, etc., which softens or melts at soldering—or welding—temperature enables soldering or welding-joints to be made to the strip conductors without removing this film previous to the joining operation. Soldering through such coatings particularly is eased if the metal strip used in the conductor tape is a tinned one, for instance made of tinned copper foil or tinned copper-wire which is flattened.

In multi-core cables it is desirable that there should be visual means of identification for the various strands and consequently differently coloured insulation materials of different braiding, etc., is used to insulate each strand before the single strands are made up into multi-core cable. In the flat cable of this invention it is possible to use the same method and make the conductive tape up with differently coloured warp threads as spacers and/or differently lacquered metal strips as conductors, but there is also a novel more advantageous method possible, namely to print the flat tape with a repeat design relating correspondingly with the length per spiral and serving for identification of the conductors. This imprint may utilise both dimensions of the tape and both sides. Indentification of the conductor itself is greatly helped by the position of the conductor in the tape and this feature in conjunction with the overcoming of restricted colour codes by the infinite possibilities of a printed design including numbering and lettering or explanatory text, as well as the use of different designs on both sides of the tape and multicolour printing makes identification of conductors and guidance for interconnection of the ends of the spirals very much easier. Of great importance also is the fact that the design can have two dimensions so as not only to identify and guide the user in respect to the cross-section of the tape but also give the imprints at the necessary intervals i. e. at the ends of the spirals. The printing of the tape may be done by silk screen methods or special tape printing devices. The specification described will be referred to as "Imprinted Tape Cable."

The manufacture of the tape cable as above described can readily be carried out in practice. Thus metal foil can be slit to any width and woven, coated or even printed by simply setting the slitting discs on standard machines, the setting of a loom, and at the most a special silk screen stencil. The initial costs are very small.

It will be apparent from the description given that the relation surface to cross-section of the conductors of the tape cable is great as compared to round wires. They will in consequence be capable of carrying a much higher current than round wires owing to their greater cooling surface. Further, the direction of the heat radiation of each conductor is the same as of the whole tape, namely perpendicular to the tape. The use of solid insulating spacers and covering tapes such as glass fibres and asbestos paper will permit the running of such cables at a relatively high temperature without risk of any softening of the insulating material at that high temperature, and the consequent danger of shorts between conductors.

The methods above described have the advantage that a loom or interleaving machine can be set up quickly without involving tooling to produce a large number of perfectly spaced and solidly insulated parallel conductors of any variation in dimension and arrangement desired for winding the coaxial spirals. It will be clear that any windings done with a tape of say 25 parallel conductors needs only 4% of the number of turns of the same winding made with a single wire and produces layer— or drum—coils with thin flat, accurately spaced, solidly and inorganically insulated conductors. The coils will also have a high space factor.

The problem of interconnection is eased by the use of resin coated conductors. If soldering is permissible the use of hot-tinned or actually solder coated copper strips or flattened tinned wires is of great assistance as the actual joining can be done by a heated jig only. But the real problem is the assembling together of the conductor ends to be joined whether by soldering or welding or mechanical means, etc., especially if there are a great number of thin, narrow, closely spaced conductors in the tape.

This assembly and the insulation of the joined conductor ends may be effected by a mechanical device which first of all permits of the tape-end being placed into a holder accurately in a predetermined position, slits the tape between the conductor strips and removed the weft thread (if there is any), spreads the odd and even conductor strips into a fan or wedge (or two fan or wedge segments between the conductors numbered 1, 4, 7, 10 . . . 2, 5, 8, 11 . . . and 3, 6, 9, 12 . . . or n—1 segments between any n selected groups of conductors) similar to the heddle-action in a loom. This fan or wedge forming separates the neighbouring conductors sufficiently to enable two things to be done: (a) to bring the conductor-ends of the other end of the tape which have been fixed in a corresponding spread-out position by the counterpart of the device described into juxtaposition with the respective conductor-ends of the first tape end; consequently by pressing the two devices together and passing a current from a welding apparatus through each of the spread-out joints in succession they are welded or soldered; (b) to slip a piece of adhesive fabric into the shed formed by the joined wedges and clip off any loose insulating threads from the tape, so that the conductors are fixed on to this adhesive fabric which guarantees the proper insulation of the joined ends when they are released from the device and pressed back into the cable plane. The device also holds a lead-out and lead-in wire with a flattened end which is joined to the appropriate tape conductors in the same way, and at the same time, as the other conductors are joined. In order to keep the free tape ends required for joining as short as possible it is preferable that the device extends substantially at right angles to the tape, leaving one side of the tape and of the shed freely accessible.

The above description relates to the joining of the two tape ends to form a continuous conductor out of the many parallel metallic warp strips. The inner end of the coil and the outer end are in this case joined so that as above indicated the inner end of conductors numbered 1, 2, 3, joins up with the outer end of conductors 2, 3, 4, etc.

For other schemes of connection the devices will be suitably modified. Thus the two mechanisms each working at one end of the tape need not be brought together for joining up, pairs of conductors instead of single ones are lifted to form the wedge and are joined together by being folded up, pressed and welded together and flattened out again.

One main requirement of satisfactory working of these joining devices is the placing of the tape-end accurately into the holder.

For this purpose the holder is not only shaped suitably but may have electrical contacts for each conductor-warp of the tape, which indicate the exact placing of the tape in the holder in relation to its width. By placing both tape ends into two holders and contacting all conductors of the tape the device can indicate by external connection of the respective contacts whether the joint is made with the tape ends as positioned in the holders will give the desired inductance or resistance value.

It is possible to produce the composite structure comprising the succession of spiral coils directly on a loom or interleaving device which produces the tape cable by attaching to the loom the heated pressure rollers above mentioned, and the asbestos paper interleaving devices, disc-interleaving, or other insulation providing devices, and to wind (without intermediate re-reeling) the tape straight on to the collapsible mandrel which pushes every tape-spiral axially off on to a growing pile as soon as a spiral is completed. As many tape spirals can thus be made on one loom with these attachments as tapes can be produced by the same loom.

As it is also possible to do the foil slitting and impregnation on the loom prior to the actual weaving, it is feasible to build a machine which would be fed with reels of metal foil and cones of fibers, insulating film or strip and produces automatically a succession of spiral coils at high speed in one continuous automatic process without human aid. Variations in the details only require different setting, no tools.

It may be mentioned that the forms of the invention shown in Figs. 1 and 2 can also be used for transformers and tight coupling can be obtained by making all the spirals double intermeshed spirals, thus giving two series of spirals which would form the primary and secondary windings. Another possibility is to intermesh two of the concertina folded structures.

I claim:

1. A transformer assembly comprising a continuous strip made of pliable insulation material and composed of two superimposed layers joined along one longitudinal edge, two parallel rows of uniformly spaced substantially flat spiral coils made of pliable electrically conductive material forming a continuous identically repeating pattern, the outer ends of successive two coils being electrically connected so as to form a plurality of pairs each including an anterior coil and a posterior coil (as seen in either one of the longitudinal directions of the strip), the said rows of coils being adhered to the outer sides of the two layers of the strip electrically insulated one from the other by the material of the two superimposed layers of the strip and situated in a spatial relationship in which each posterior coil in one row is in superposition with an anterior coil in the other row as seen in the same longitudinal direction of the strip, a plurality of electric joint members each extending through the two superimposed layers of the strip for electrically and mechanically connecting the inner ends of a superimposed posterior coil and anterior coil thereby joining the thus connected pairs of coils in an electric pathway pattern, elongated ferrous core strips sandwiching said strip therebetween, and ferrous joints extending between the two core strips through the centers of each pair of superimposed coils, the said ferrous joints constituting a short circuited secondary of said transformer.

2. A transformer assembly comprising a continuous strip made of pliable insulation material and composed of two superimposed layers, two parallel rows of uniformly spaced substantially flat spiral windings in approximately S-shaped arrangement and made of pliable electrically conductive material forming a continuous identically repeating pattern in each row, the outer ends of successive two windings being electrically connected so as to form a plurality of pairs each including an anterior winding and a posterior winding as seen in either one of the longitudinal directions of the strip, the said rows of windings being adhered to the outer sides of the two layers of the strip electrically insulated one from the other by the material of the superimposed two layers of the strip and situated in a spatial relationship in which each posterior winding in one row is in superposition with an anterior winding in the other row as seen in the longitudinal direction of the strip, a plurality of electric joint members each extending through the two superimposed layers of the strip for electrically and mechanically connecting the inner ends of a superimposed posterior winding and anterior winding thereby joining the thus connected pairs of windings in an electric pathway pattern, elongated ferrous core strips sandwiching said strip therebetween, and ferrous joints extending between the two core strips through the centers of each pair of superimposed windings, the said ferrous joints constituting a short circuited secondary of said transformer assembly.

References Cited in the file of this patent

UNITED STATES PATENTS

| | | |
|---|---|---|
| 1,647,474 | Seymour | Nov. 1, 1927 |
| 2,014,524 | Franz | Sept. 17, 1935 |
| 2,441,960 | Eisler | May 15, 1948 |